United States Patent
Zheng et al.

(10) Patent No.: US 10,026,184 B2
(45) Date of Patent: Jul. 17, 2018

(54) GRADING METHOD AND DEVICE FOR DIGITAL IMAGE QUALITY

(71) Applicant: Alibaba Group Holding Limited, Grand Cayman (KY)

(72) Inventors: Qi Zheng, Hangzhou (CN); Yongpan Wang, Hangzhou (CN)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 0 days.

(21) Appl. No.: 15/116,828

(22) PCT Filed: Feb. 2, 2015

(86) PCT No.: PCT/CN2015/072114
§ 371 (c)(1),
(2) Date: Aug. 5, 2016

(87) PCT Pub. No.: WO2015/120771
PCT Pub. Date: Aug. 20, 2015

(65) Prior Publication Data
US 2017/0178339 A1    Jun. 22, 2017

(30) Foreign Application Priority Data
Feb. 11, 2014    (CN) .......................... 2014 1 0048608

(51) Int. Cl.
*G06K 9/00*    (2006.01)
*G06T 7/11*    (2017.01)

(52) U.S. Cl.
CPC ...... *G06T 7/11* (2017.01); *G06T 2207/20021* (2013.01); *G06T 2207/30168* (2013.01)

(58) Field of Classification Search
CPC ......... G06T 2207/30168; G06T 7/0002; G06T 7/136; G06T 5/00; G06K 9/036; G06K 9/6289
See application file for complete search history.

(56) References Cited

U.S. PATENT DOCUMENTS

2008/0219530 A1* 9/2008 Levanon ............ A61B 5/02007
                                                                    382/130
2009/0245589 A1* 10/2009 Komoto .................. B41J 13/10
                                                                    382/112
(Continued)

FOREIGN PATENT DOCUMENTS

CN    101452181 A    6/2009
CN    102270303 A    12/2011
(Continued)

OTHER PUBLICATIONS

International Search Report issued in corresponding PCT Application No. PCT/CN15/072114, dated May 4, 2015.

*Primary Examiner* — Eueng-Nan Yeh
(74) *Attorney, Agent, or Firm* — James J. DeCarlo; Greenberg Traurig, LLP

(57) ABSTRACT

The disclosure describes a grading method and device for digital image quality. The method comprises: obtaining a digital image and extracting n main body region blocks from the image; calculating a first ratio value of the area of a plurality of main body region blocks to the total area of the image, a second ratio value of the area of background region blocks to the total area of the image, and a normalized distance value from a plurality of the pixel points in the plurality of main body region blocks to a center pixel point of the image; calculating to obtain a quality score value of the image through a preset digital image quality score conversion relation based on the first ratio value, the second ratio value, and the normalized distance value; and grading a quality of image according to a quality score value of the image and a preset digital image quality score threshold value.

23 Claims, 3 Drawing Sheets

(56) References Cited

U.S. PATENT DOCUMENTS

2011/0292234 A1 12/2011 Mitsumoto
2013/0108152 A1* 5/2013 Deng .................... G06T 7/0002
  382/159

FOREIGN PATENT DOCUMENTS

CN  103024165 A  4/2013
JP  2008158790 A  7/2008

* cited by examiner

GRADING METHOD AND DEVICE FOR DIGITAL IMAGE QUALITY

CROSS-REFERENCE TO RELATED APPLICATIONS

This application claims the benefit of priority from Chinese Patent Application No. 201410048608.1, filed on Feb. 11, 2014, and PCT Application No. PCT/CN2015/072114, filed on Feb. 2, 2015, which are both hereby incorporated by reference in their entirety.

TECHNICAL FIELD

The present disclosure relates to the technical field of computer communications, and in particular to a grading method and device for digital image quality.

BACKGROUND

With the popularity of digital image capturing devices (e.g., smartphones), persons and enterprises today manage more and more digital images. Automatic deletion of poor quality digital images and preservation of good quality digital images are important to applications, such as personal album management applications and commodity picture management applications. To realize the aforementioned functions, digital image quality needs to be graded often. The quality of the digital image can be determined according to a grading result of the digital image quality, thus further determining whether digital images are deleted or preserved. Therefore, people often try to determine improvements in the grading of the quality of digital images.

An existing digital image quality grading method includes acquiring the digital image, extracting main body region blocks in the digital image; calculating numbers, sizes and positions of main bodies contained in the digital image according to the extracted main body region blocks; and performing quality grading on the digital image according to the numbers, sizes and positions of the main body contained, as well as preset number threshold values, size threshold values and position threshold values.

The existing digital image quality grading method performs quality grading on digital images according to the numbers, sizes and positions of the main body contained in each digital image, as well as the preset number threshold values, size threshold values and position threshold values. Sometimes, there are more elements required, and when the digital image is subjected to quality grading, a grading rule setting is more difficult to determine and the realization process is more complex.

SUMMARY

The present disclosure provides a grading method and device for digital image quality by calculating a first ratio value of the area of a plurality of main body region blocks to the total area of a digital image, a second ratio value of the area of background region blocks to the total area of the digital image, and a normalized distance value from a plurality of the pixel points in the plurality of main body region blocks to a center pixel point of the digital image; obtaining a quality score value of the digital image through a preset digital image quality score conversion relation based on the first ratio value, the second ratio value, and the normalized distance value. According to the quality score value of the digital image and a preset quality score threshold value of the digital image, the quality of the digital image is graded, and the quality score threshold value of the digital image is easy to configure and realization is simple and efficient.

In one aspect, the present disclosure describes a grading method for digital image quality. The method comprises:

obtaining a digital image and extracting n main body region blocks from the digital image, wherein n is a natural number;

calculating a first ratio value of the area of a plurality of main body region block to the total area of the digital image, a second ratio value of the area of background region blocks to the total area of the digital image, and a normalized distance value from a plurality of the pixel points in the plurality of main body region blocks to a center pixel point of the digital image, wherein the background region blocks are residual region blocks after the n main body region blocks are extracted from the digital image;

calculating to obtain a quality score value of the digital image through a preset digital image quality score conversion relation based on the first ratio value, the second ratio value, and the normalized distance value, wherein the preset digital image quality score conversion relation is a directly proportional function of a sum of the first ratio values of the plurality of main body region blocks, a sum of the second ratio values, and a sum of the normalized distances of the plurality of main body region blocks; and grading a quality of the digital image according to a quality score value of the digital image and a preset digital image quality score threshold value.

Further, in one embodiment, the preset digital image quality score conversion relation S is $$S = \sum_{i=1}^{n} S_b S_{fi}(1 - R_i),$$

wherein, $S_{fi}$ denotes the first ratio value of the area of the $i^{th}$ main body region block to the total area of a digital image, $S_b$ denotes a second ratio value of the area of background region blocks to the total area of the digital image, n is the number of the main body region blocks extracted from the digital image, and $R_i$ denotes a normalized distance value from a plurality of the pixel points in the $i^{th}$ main body region block to a center pixel point of the digital image.

Further, in one embodiment, calculating a normalized distance value from a plurality of the pixel points in the plurality of main body region blocks to a center pixel point of the digital image further comprises:

calculating a square root distance value between a plurality of pixel points in the plurality of main body region blocks and the center pixel point of the digital image;

summing the square root distances of a plurality of the pixel points in the plurality of main body region blocks to obtain a total square root distance value of a plurality of the pixel points in the plurality of main body region blocks; and calculating to obtain a normalized distance value from a plurality of the pixel points in the plurality of main body region blocks to a center pixel point of the digital image through a preset distance normalization conversion relation based on the total square root distance value of a plurality of the pixel points in the plurality of main body region blocks, wherein the preset distance normalization conversion relation is a normalized process imposed on the total square root distance value of a plurality of the pixel points in the plurality of main body region blocks according to a selected normalized parameter value.

Further, in one embodiment, the preset distance normalization conversion relation $R_i$ is $R_i = 2r_i/\sqrt{w^2+h^2}$, wherein, $r_i$ is the total square root distance value of a plurality of the pixel points in the $i^{th}$ main body region block, $\sqrt{w^2+h^2}$ is the selected normalized parameter value, w is a width of the digital image, and h is a height of the digital image.

Further, in one embodiment, after calculating to obtain the quality score value of the digital image, the method further comprises:

obtaining an optimal theoretical quality score value;

using a quotient between the calculated quality score value of the digital image and the optimal theoretical quality score value as a normalized quality score value for the digital image; and correspondingly, grading the quality of the digital image according to the quality score value of the digital image and the preset digital image quality score threshold value comprising:

grading the quality of the digital image according to the normalized quality score value of the digital value and a preset normalized digital image quality score threshold value.

Further, in one embodiment, obtaining the optimal theoretical quality score value comprises:

selecting values of n, $S_{fi}$, $S_b$ and $R_i$ according to a relation between the number of the main body region blocks and the quality of the digital image, and a relation among the first ratio value, the second ratio value, and the normalized distance value; and substituting the selected values of n, $S_{fi}$, $S_b$ and $R_i$ into the preset digital image quality score conversion relation S, and taking a calculated maximum value as the optimal theoretical quality score value.

Further, in one embodiment, grading a quality of the digital image according to a quality score value of the digital image and a preset digital image quality score threshold value comprises:

comparing the quality score value of the digital image and the preset digital image quality score threshold value;

setting a grade of the digital image to be a grade greater than a grade corresponding to the preset digital image quality score threshold value if the quality score value of the digital image is larger than the preset digital image quality score threshold value; and setting a grade of the digital image to be a grade less than or equal to a grade corresponding to the preset digital image quality score threshold value if the quality score value of the digital image is smaller than or equal to the preset digital image quality score threshold value.

In another aspect, the present disclosure further describes a digital image quality grading device, comprising: an acquiring module or logic, used for obtaining a digital image and extracting n main body region blocks from the digital image, wherein n is a natural number; a first calculating module or logic, used for calculating a first ratio value of the area of a plurality of main body region blocks to the total area of the digital image, a second ratio value of the area of background region blocks to the total area of the digital image, and a normalized distance value from a plurality of pixel points in the plurality of main body region blocks to a center pixel point of the digital image, wherein the background region blocks are residual region blocks after the n main body region blocks are extracted from the digital image; a second calculating module or logic, used for calculating a quality score value of the digital image through a preset digital image quality score conversion relation based on the first ratio value, the second ratio value, and the normalized distance value, wherein the preset digital image quality score conversion relation is a directly proportional function of a sum of the first ratio values of the plurality of main body region blocks, a sum of the second ratio values, and a sum of the normalized distances of the plurality of main body region blocks; and a grading module or logic, used for grading a quality of the digital image according to a quality score value of the digital image and a preset digital image quality score threshold value.

Further, in one embodiment, the first calculating module comprises: a first calculating unit, used for calculating a square root distance value between a plurality of pixel points in the plurality of main body region blocks and the center pixel point of the digital image; a summing unit, used for summing the square root distances of a plurality of the pixel points in the plurality of main body region blocks to obtain a total square root distance value of a plurality of the pixel points in the plurality of main body region blocks; and a second calculating unit, used for calculating a normalized distance value from a plurality of the pixel points in the plurality of main body region blocks to a center pixel point of the digital image through a preset distance normalization conversion relation based on the total square root distance value of a plurality of the pixel points in the plurality of main body region blocks, wherein the preset distance normalization conversion relation is a normalized process imposed on the total square root distance value of a plurality of the pixel points in the plurality of main body region blocks according to a selected normalized parameter value.

Further, in one embodiment, the second calculating module comprises: an obtaining unit, used for obtaining an optimal theoretical quality score value; a processing unit, used for using a quotient between the calculated quality score value of digital image and the optimal theoretical quality score value as a normalized quality score value of the digital image; wherein the grading module comprises: a grading unit, used for grading the quality of the digital image according to the normalized quality score value of the digital value and a preset normalized digital image quality score threshold value.

Further, in one embodiment, the obtaining unit comprises: a selecting subunit, used for selecting values of n, $S_{fi}$, $S_b$, and $R_i$ according to a relation between the number of the main body region blocks and the quality of the digital image, and a relation among the first ratio value, the second ratio value, and the normalized distance value; and a processing subunit, used for substituting the selected values of n, $S_{fi}$, $S_b$, and $R_i$ into the preset digital image quality score conversion relation S, and taking a calculated maximum value as the optimal theoretical quality score value.

Further, in one embodiment, the grading module comprises: a comparing unit, used for comparing the quality score value of the digital image and the preset digital image quality score threshold value; a first grading unit, used for setting a grade of the digital image to be a grade greater than a grade corresponding to the preset digital image quality score threshold value if the quality score value of the digital image is larger than the preset digital image quality score threshold value; and a second grading unit, used for setting a grade of the digital image to be a grade less than or equal to a grade corresponding to the preset digital image quality score threshold value if the quality score value of the digital image is smaller than or equal to the preset digital image quality score threshold value.

In one embodiment, the present disclosure may obtain following technical effects: calculating a first ratio value of the area of a plurality of main body region blocks to the total area of a digital image, a second ratio value of the area of background region blocks to the total area of the digital image, and a normalized distance value from a plurality of the pixel points in the plurality of main body region blocks to a center pixel point of the digital image; a quality score value of the digital image is obtained through a preset digital image quality score conversion relation based on the first ratio value, the second ratio value, and the normalized distance value; according to the quality score value of the digital image and a preset quality score threshold value of the digital image, the quality of the digital image is graded, the quality score threshold value of the digital image is easy to configure and realization is simple and efficient.

BRIEF DESCRIPTION OF THE DRAWINGS

Described drawings herein are used for providing further understanding for the present disclosure and constitute a portion of the present application. Exemplary embodiments and descriptions thereof of the present disclosure intend to explain the present disclosure rather than improperly limiting the present disclosure. In the drawings.

DETAILED DESCRIPTION

Figure 1:
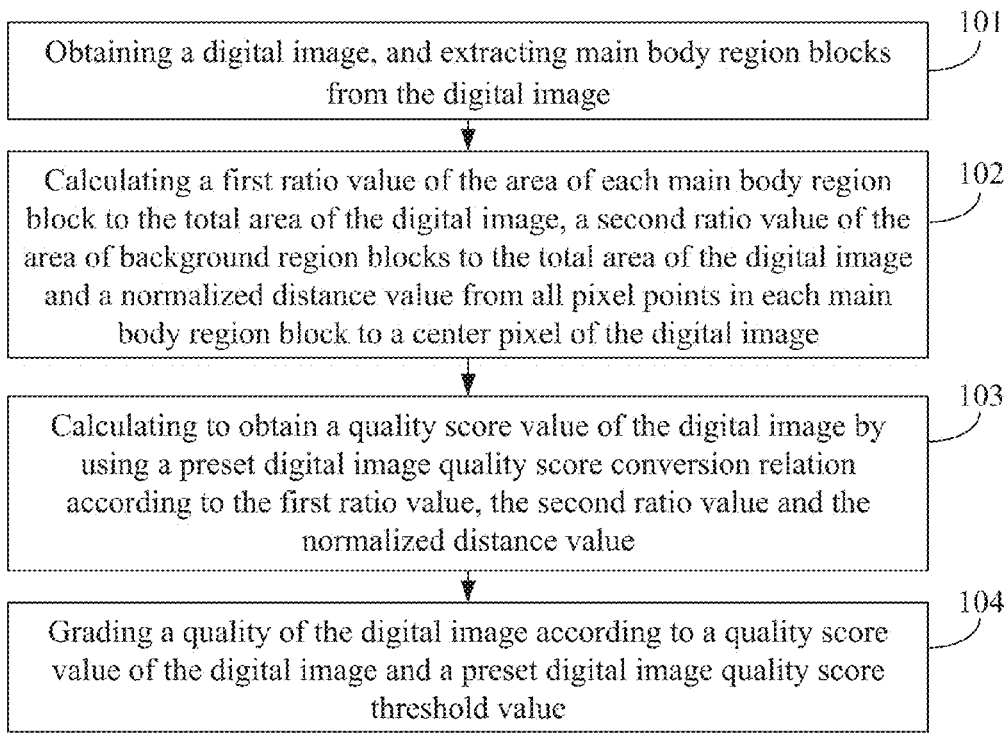
FIG. 1 is a flow diagram of a grading method for digital image quality according to an embodiment of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered subject matter is intended to be construed as not being limited to any example embodiments set forth herein; example embodiments are provided merely to be illustrative. Likewise, a reasonably broad scope for covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the disclosure, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure, a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. As discussed below, computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a smart phone, phablet or tablet may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows®, iOS® or Linux®, or a mobile operating system, such as iOS, Android®, or Windows® Mobile, or the like.

A client device may include or may execute a variety of possible applications, such as a client software application enabling communication with other devices, such as communicating one or more messages, such as via email, short message service (SMS), or multimedia message service (MMS), including via a network, such as a social network, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games.

Embodiments of the present disclosure are described in detail with accompanying drawings and examples, thereby solving the technical problems by applying a technical means and fully understanding and implementing a realization process of achieving the technical effects.

In one embodiment, a calculating device includes one or more processors (CPU), an input/output interface, a network interface and a memory. The memory may include a volatile memory in a computer readable storage medium, a random access memory (RAM) and/or a nonvolatile memory, such as a read-only memory (ROM) or a flash memory. The memory can be an example of a computer readable medium.

The computer readable storage medium includes nonvolatile and volatile, mobile and non-mobile media and can realize information storage with any method or technology. Information can be a computer readable command, a data structure, a module of a program or other data. The computer readable medium excludes transitory computer readable media, such as a modulated data signal and carrier wave.

FIG. 1 is a flow diagram of a grading method for digital image quality according to an embodiment of the present disclosure. In one embodiment, the method is executed by a processor and includes:

Step 101: obtaining, by a processor, a digital image (e.g., receiving, by a client device or a server computer, the digital image) and extracting, by the processor, n main body region blocks from the digital image, where n is a natural number. The digital image may be captured, for example, by a client device (e.g., a smartphone) and transmitted to a server computer over a network or may be stored and processed on the client device. In another embodiment, a server computer may store a plurality of digital images (e.g., on a social network, on a web page, etc.) for processing. One or more main bodies may exist in the digital image, and one or more main body region blocks can be extracted from the digital image. In addition, when the main body region blocks are extracted from the digital image, any feasible extraction method can be adopted, such as an obvious region extracting method;

Step 102: calculating, by the processor, a first ratio value of the area of each main body region block to the total area of the digital image, a second ratio value of the area of background region blocks to the total area of the digital image and a normalized distance value from all the pixel points in each main body region block to a center pixel point of the digital image. In one embodiment, the background region blocks are residual region blocks after the n main body region blocks are extracted from the digital image.

In one embodiment, calculating a normalized distance value from all the pixel points in each main body region block to a center pixel point of the digital image further includes calculating, by the processor, a square root distance value between each pixel point in each main body region block and the center pixel point of the digital image (e.g., performing a method of difference, square summing and then extracting the root between coordinates of pixel points of the main body region block and coordinates of the center pixel point); summing, by the processor, the square root distances of all the pixel points in each main body region block to obtain a total square root distance value of all the pixel points in each main body region block; and calculating, by the processor, a normalized distance value from all the pixel points in each main body region block to a center pixel point of the digital image through a preset distance normalization conversion relation based on the total square root distance value of all the pixel points in each main body region block, wherein the preset distance normalization conversion relation is a normalized process imposed on the total square root distance value of all the pixel points in each main body region block according to a selected normalized parameter value.

In one embodiment, the normalized parameter value can be flexibly selected according to practical application conditions, such as taking a square root of a square of a width of the digital image and a square of a height of the digital image as the normalized parameter value. In the present embodiment, the preset distance normalization conversion relation $R_i$ is $R_i = 2r_i/\sqrt{w^2+h^2}$, wherein $r_i$ is the total square root distance value of all the pixel points in the $i^{th}$ main body region block, $\sqrt{w^2+h^2}$ is the selected normalized parameter value, w is the width of the digital image, and h is the height of the digital image.

According to the preset distance normalization conversion relation $R_i$, the calculated $R_i$ value is the normalized distance value from all the pixel points of each main body region block to the center pixel point of the digital image.

In one embodiment, the method also includes Step 103: calculating, by the processor, a quality score value of the digital image through a preset digital image quality score conversion relation based on the first ratio value, the second ratio value and the normalized distance value, wherein the preset digital image quality score conversion relation is a directly proportional function of a sum of the first ratio values of all main body region blocks, a sum of all second ratio values, and a sum of all normalized distances of all main body region blocks. In one embodiment, a representation of the preset digital image quality score conversion relation can be flexibly set according to practical application conditions.

In one embodiment, the preset digital image quality score conversion relation S is $$S = \sum_{i=1}^{n} S_b S_{fi}(1 - R_i),$$

wherein, $S_{fi}$ denotes the first ratio value of the area of the $i^{th}$ main body region block to the total area of a digital image, $S_b$ denotes a second ratio value of the area of background region blocks to the total area of the digital image, n is the number of the main body region blocks extracted from the digital image, and $R_i$ denotes a normalized distance value from all the pixel points in the $i^{th}$ main body region block to a center pixel point of the digital image.

According to the preset digital image quality score conversion relation S, in one embodiment a calculated S value is the quality score value of the digital image. In addition, after calculating the quality score value of the digital image, the method can further include: obtaining, by the processor, an optimal theoretical quality score value; using, by the processor, a quotient obtained from dividing the calculated quality score value of the digital image with the optimal theoretical quality score value as a normalized quality score value of the digital image, wherein obtaining the optimal theoretical quality score value includes: selecting, by the processor, values of n, $S_{fi}$, $S_b$ and $R_i$ according to a relation between the number of the main body region blocks and the quality of the digital image, and a relation among the first ratio value, the second ratio value and the normalized distance value; and substituting, by the processor, the selected values of n, $S_{fi}$, $S_b$ and $R_i$ into the preset digital image quality score conversion relation S, and taking, by the processor, a calculated maximum value as the optimal theoretical quality score value.

When the digital image has one main body in the middle, the quality score value of the digital value is higher, so when n is 1, a pixel point of $R_i$ is in the middle, and by selecting different $S_{fi}$, $S_b$ values, the optical theoretical quality score value (about 0.13) is obtained when $S_{fi}$ is 37% and $S_b$ is 63%.

In one embodiment, the method includes Step 104: grading, by the processor, a quality of the digital image according to a quality score value of the digital image and a preset digital image quality score threshold value. In one embodiment, grading the quality of the digital image according to the quality score value of the digital image and the preset digital image quality score threshold value comprises: comparing, by the processor, the quality score value of the digital image and the preset digital image quality score threshold value; setting, by the processor, a grade of the digital image to be a grade greater than a grade corresponding to the preset digital image quality score threshold value if the quality score value of the digital image is larger than the preset digital image quality score threshold value; and setting, by the processor, a grade of the digital image to be a grade less than or equal to a grade corresponding to the preset digital image quality score threshold value if the quality score value of the digital image is smaller than or equal to the preset digital image quality score threshold value.

In one embodiment, the digital image quality score threshold value can be set according to manual experience, or can be obtained by manually marking the digital images of different grades through a machine learning method. In addition, the quality of the digital image can be graded by any other feasible methods rather than limiting to the aforementioned method, and is not specifically limited to this herein.

In addition and in one embodiment, when the normalized quality score value is obtained in Step 103, grading the quality of the digital image according to the quality score value of the digital image and the preset digital image quality score threshold value includes grading the quality of the digital image according to the normalized quality score value of the digital image and the normalized digital image quality threshold value.

Figure 2:
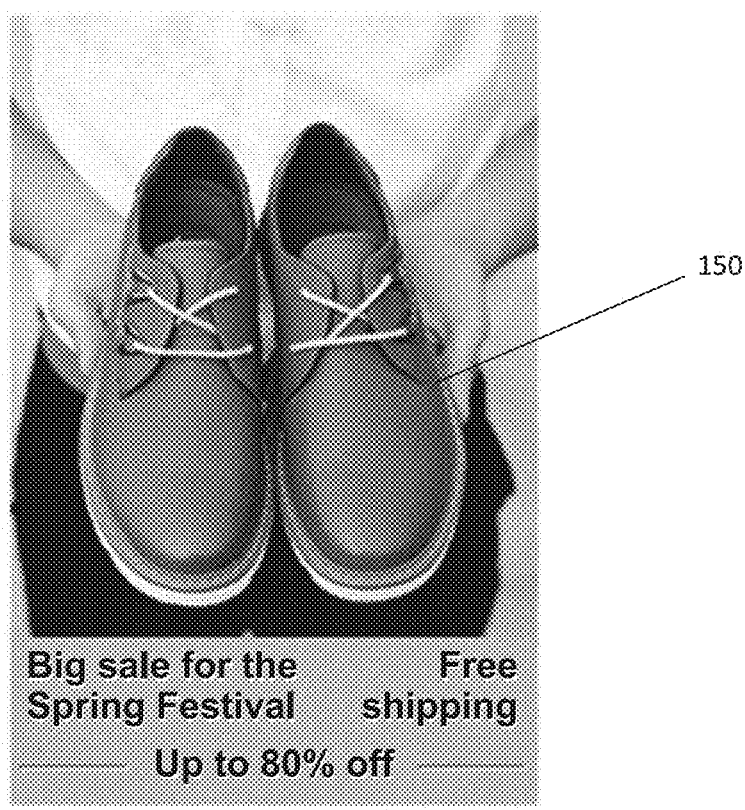
FIG. 2 is a schematic diagram of digital image quality grading according to an embodiment of the present disclosure.

For example, with reference to FIG. 2, the main body region block (only one) 150 is a region block where a shoe is located, and by using the method in this embodiment, the first ratio value $S_{fi}$ of the area of the first main body region block to the total area of the digital image is calculated as 0.3622, the second ratio value $S_b$ of the area of the background region block to the total area of the digital image is 0.6378, and a normalized distance value $R_i$ from all the pixel points in the first main body region block to a center pixel point of the digital image is 0.4451. By using the preset digital image quality score conversion relation S:

$$S = \sum_{i=1}^{n} S_b S_{fi}(1 - R_i),$$

the quality score value S of the digital image is calculated as 0.1282. According to the normalized quality score value 0.97 of the digital image and the normalized digital image quality score threshold value, the quality of the digital image in FIG. 2 is graded to be a high quality main body.

According to the grading method for digital image quality of the present embodiment, calculating a first ratio value of the area of each main body region block to the total area of a digital image, a second ratio value of the area of background region blocks to the total area of the digital image, and a normalized distance value from all the pixel points in each main body region block to a center pixel point of the digital image; a quality score value of the digital image is obtained through a preset digital image quality score conversion relation based on the first ratio value, the second ratio value, and the normalized distance value; according to the quality score value of the digital image and a preset quality score threshold value of the digital image, the quality of the digital image is graded, the quality score threshold value of the digital image is easy to configure and realization is simple and efficient.

Figure 3:
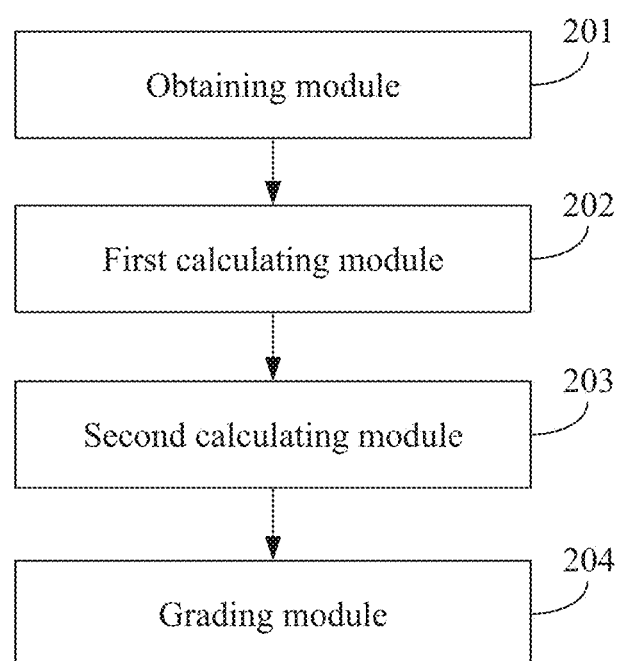
FIG. 3 is a structural schematic diagram of a digital image quality grading device according to an embodiment of the present disclosure.

As shown in FIG. 3, a structural schematic diagram of a digital image quality grading device according to an embodiment of the present disclosure is shown. The device can execute the method described above and includes, in one embodiment:

an acquiring or obtaining module or logic 201, executed by the processor, for obtaining a digital image and extracting n main body region blocks from the digital image, where n is a natural number;

a first calculating module or logic 202, executed by the processor, for calculating a first ratio value of the area of each main body region block to the total area of the digital image, a second ratio value of the area of background region blocks to the total area of the digital image and a normalized distance value from all the pixel points in each main body region block to a center pixel point of the digital image, wherein the background region blocks are residual region blocks after the n main body region blocks are extracted from the digital image;

a second calculating module or logic 203, executed by the processor, for calculating a quality score value of the digital image through a preset digital image quality score conversion relation based on the first ratio value, the second ratio value, and the normalized distance value, wherein the preset digital image quality score conversion relation is a directly proportional function of a sum of the first ratio values of all main body region blocks, a sum of all second ratio values, and a sum of all normalized distances of all main body region blocks; and a grading module or logic 204, executed by the processor, for grading a quality of the digital image according to a quality score value of the digital image and a preset digital image quality score threshold value.

In one embodiment, the preset digital image quality score conversion relation S is $$S = \sum_{i=1}^{n} S_b S_{fi}(1 - R_i),$$

wherein $S_{fi}$ denotes the first ratio value of the area of the $i^{th}$ main body region block to the total area of a digital image, $S_b$ denotes a second ratio value of the area of background region blocks to the total area of the digital image, n is the number of the main body region blocks extracted from the digital image, and $R_i$ denotes a normalized distance value from all the pixel points in the $i^{th}$ main body region block to a center pixel point of the digital image.

In one embodiment, the first calculating module 202 comprises: a first calculating unit, used for calculating a square root distance value between each pixel point in each main body region block and the center pixel point of the digital image; a summing unit, used for summing the square root distances of all the pixel points in each main body region block to obtain a total square root distance value of all the pixel points in each main body region block; and a second calculating unit, used for calculating a normalized distance value from all the pixel points in each main body region block to a center pixel point of the digital image through a preset distance normalization conversion relation based on the total square root distance value of all the pixel points in each main body region block, wherein the preset distance normalization conversion relation is a normalized process imposed on the total square root distance value of all the pixel points in each main body region block according to a selected normalized parameter value.

In one embodiment, the preset distance normalization conversion relation $R_i$ is $R_i = 2r_i/\sqrt{w^2+h^2}$, wherein $r_i$ is the total square root distance value of all the pixel points in the $i^{th}$ main body region block, $\sqrt{w^2+h^2}$ is the selected normalized parameter value, w is the width of the digital image, and h is the height of the digital image.

In one embodiment, the second calculating module 203 comprises: an obtaining unit, used for obtaining an optimal theoretical quality score value; and a processing unit, used for using a quotient between the calculated quality score value of digital image and the optimal theoretical quality score value as a normalized quality score value of the digital image.

The grading module or logic 204 comprises: a grading unit, executed by the processor, for grading the quality of the digital image according to the normalized quality score value of the digital image and a preset normalized digital image quality score threshold value. In one embodiment, the obtaining unit comprises: a selecting subunit, executed by the processor, for selecting values of n, $S_{fi}$, $S_b$ and $R_i$ according to a relation between the number of the main body region blocks and the quality of the digital image, and relation among the first ratio value, the second ratio value and the normalized distance value; and a processing subunit, executed by the processor, for substituting the selected values of n, $S_{fi}$, $S_b$ and $R_i$ into the preset digital image quality score conversion relation S, and taking a calculated maximum as the optimal theoretical quality score value.

In one embodiment, the grading module 204 comprises: a comparing unit, executed by the processor, for comparing the quality score value of the digital image and the preset digital image quality score threshold value; a first grading unit, executed by the processor, for setting a grade of the digital image to be a grade greater than a grade corresponding to the preset digital image quality score threshold value if the quality score value of the digital image is larger than the preset digital image quality score threshold value; and a second grading unit, executed by the processor, for setting a grade of the digital image to be a grade less than or equal to a grade corresponding to the preset digital image quality score threshold value if the quality score value of the digital image is smaller than or equal to the preset digital image quality score threshold value.

According to the digital image quality device of the present embodiment, by calculating a first ratio value of the area of each main body region block to the total area of a digital image, a second ratio value of the area of background region blocks to the total area of the digital image, and a normalized distance value from all the pixel points in each main body region block to a center pixel point of the digital image; a quality score value of the digital image is obtained through a preset digital image quality score conversion relation based on the first ratio value, the second ratio value, and the normalized distance value; according to the quality score value of the digital image and a preset quality score threshold value of the digital image, the quality of the digital image is graded, the quality score threshold value of the digital image is easy to configure and realization is simple and efficient.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The aforementioned specification illustrates and describes a plurality of embodiments of the present disclosure, but as mentioned before, it should be understood that the present disclosure is not limited to the disclosure of the specification, not regarded as exclusion to other embodiments, and can be used in various combinations, modifications and environments and can be changed by the aforementioned teaching or technologies or knowledge in related arts in a concept scope of the specification. Modifications and changes performed by those skilled in the art are not separated from the spirit and scope of the present disclosure and should fall within a protective scope of the appended claims.

What is claimed is:

1. A grading method for digital image quality, comprising:
   obtaining, by a processor, a digital image;
   extracting, by the processor, a plurality of main body region blocks from the digital image, a number of the plurality of main body region blocks comprising a natural number;
   calculating, by the processor for each of the main body region blocks, a first ratio value of an area of a respective main body region blocks to a total area of the digital image, a second ratio value of an area of background region blocks to the total area of the digital image, and a normalized distance value from a plurality of pixel points in the respective main body region blocks to a center pixel point of the digital image, the background region blocks comprising residual region blocks after each of the main body region blocks are extracted from the digital image;
   calculating, by the processor, a quality score value of the digital image through a preset digital image quality score conversion relation based on the first ratio values, the second ratio value, and the normalized distance values, the preset digital image quality score conversion relation comprising a sum of the first ratio values the second ratio values, and the normalized distance values; and
   grading, by the processor, a quality of the digital image according to the quality score value of the digital image and a preset digital image quality score threshold value.

2. The method according to claim 1, the preset digital image quality score conversion relation S comprising $$S = \sum_{i=1}^{n} S_b S_{fi}(1 - R_i),$$

where,
   $S_{fi}$ denotes the first ratio value of an area of the $i^{th}$ main body region block to the total area of the digital image,
   $S_b$ denotes the second ratio value of the area of the background region blocks to the total area of the digital image, n is the number of the main body region blocks extracted from the digital image, and $R_i$ denotes the normalized distance value from the plurality of the pixel points in the $i^{th}$ main body region block to the center pixel point of the digital image.

3. The method according to claim 1, the calculating the normalized distance value from a plurality of the pixel points in a plurality of main body region blocks to the center pixel point of the digital image further comprising:
   calculating, by the processor, a square root distance value between the plurality of pixel points in the plurality of main body region blocks and the center pixel point of the digital image;
   summing, by the processor, the square root distances of the plurality of the pixel points in the plurality of main body region blocks to obtain a total square root distance value of the plurality of the pixel points in the plurality of main body region blocks; and
   calculating, by the processor, the normalized distance value from the plurality of the pixel points in the plurality of main body region blocks to the center pixel point of the digital image through a preset distance normalization conversion relation based on the total square root distance value of the plurality of the pixel points in the plurality of main body region blocks, the preset distance normalization conversion relation comprising a normalized process imposed on the total square root distance value of the plurality of the pixel points in the plurality of main body region blocks according to a selected normalized parameter value.

4. The method according to claim 3, the preset distance normalization conversion relation $R_i$ comprising $R_i = 2r_i/\sqrt{w^2+h^2}$,
   where, $r_i$ is the total square root distance value of a plurality of the pixel points in the $i^{th}$ main body region block, $\sqrt{w^2+h^2}$ is the selected normalized parameter value, w is a width of the digital image, and h is a height of the digital image.

5. The method according to claim 1, further comprising, after calculating and obtaining the quality score value of the digital image:
   obtaining, by the processor, an optimal theoretical quality score value;
   using, by the processor, a quotient between the calculated quality score value of the digital image and the optimal theoretical quality score value as a normalized quality score value for the digital image; and
   grading, by the processor, the quality of the digital image according to the quality score value of the digital image and the preset digital image quality score threshold value, the grading comprising:
   grading, by the processor, the quality of the digital image according to the normalized quality score value of the digital image and a preset normalized digital image quality score threshold value.

6. The method according to claim 5, the obtaining the optimal theoretical quality score value further comprising:
   selecting, by the processor, values of n, $S_{fi}$, $S_b$, and $R_i$ according to a relation between the number of the main body region blocks and the quality of the digital image, and a relation among the first ratio value, the second ratio value, and the normalized distance value, where $S_{fi}$ denotes the first ratio value of an area of the $i^{th}$ main body region block to the total area of the digital image, $S_b$ denotes the second ratio value of the area of the background region blocks to the total area of the digital image, n is the number of the main body region blocks extracted from the digital image, and $R_i$ denotes the normalized distance value from the plurality of the pixel points in the $i^{th}$ main body region block to the center pixel point of the digital image; and
   substituting, by the processor, the selected values of n, $S_{fi}$, $S_b$, and $R_i$ into the preset digital image quality score conversion relation S, and taking, by the processor, a calculated maximum value as the optimal theoretical quality score value.

7. The method according to claim 1, the grading a quality of the digital image according to a quality score value of the digital image and a preset digital image quality score threshold value further comprising:

comparing, by the processor, the quality score value of the digital image and the preset digital image quality score threshold value;

setting, by the processor, a grade of the digital image to be a grade greater than a grade corresponding to the preset digital image quality score threshold value when the quality score value of the digital image is larger than the preset digital image quality score threshold value; and setting, by the processor, a grade of the digital image to be a grade less than or equal to a grade corresponding to the preset digital image quality score threshold value when the quality score value of the digital image is smaller than or equal to the preset digital image quality score threshold value.

8. The method of claim 1 the preset digital image quality score conversion relation calculated by summing a product for each of the plurality of main body region blocks, the product computed for a main body region block based on the first ratio value of art area of the main body region block to the total area of the digital image, the second ratio value of the area of the background region blocks to the total area of the digital image, and the normalized distance value from a plurality of the pixel points in the main body region block to the center pixel point of the digital image, and the normalized distance value based on a preset distance normalization conversion relation for a main body region block, the preset distance normalization conversion relation calculated by computing twice the product of a total square root distance value of a plurality of the pixel points in the main body region block and the selected normalized parameter value.

9. A digital image quality grading device comprising:
a processor;
a storage medium for tangibly storing thereon program logic for execution by the processor, the program logic comprising:
acquiring logic executed by the processor for obtaining a digital image and extracting a plurality of main body region blocks from the digital image, a number of the plurality of main body region blocks comprising a natural number;
first calculating logic executed by the processor for calculating for each of the main body region blocks, a first ratio value of an area of a respective main body region blocks to a total area of the digital image, a second ratio value of an area of background region blocks to the total area of the digital image, and a normalized distance value from a plurality of pixel points in the respective main body region blocks to a center pixel point of the digital image, the background region blocks comprising residual region blocks after each of the main body region blocks are extracted from the digital image;
second calculating logic executed by the processor for calculating a quality score value of the digital image through a preset digital image quality score conversion relation based on the first ratio value, the second ratio value, and the normalized distance values, the preset digital image quality score conversion relation comprising a sum of the first ratio values of the plurality of main body region blocks, the second ratio values, and the normalized distances of the plurality of main body region blocks; and
grading logic executed by the processor for grading a quality of the digital image according to a quality score value of the digital image and a preset digital image quality score threshold value.

10. The device according to claim 9, the preset digital image quality score conversion relation S comprising $$S = \sum_{i=1}^{n} S_b S_{fi}(1 - R_i),$$

where, $S_{fi}$ denotes the first ratio value of the area of the $i^{th}$ main body region block to the total area of a digital image, $S_b$ denotes the second ratio value of the area of the background region blocks to the total area of the digital image, n is the number of the main body region blocks extracted from the digital image, and $R_i$ denotes a normalized distance value from a plurality of the pixel points in the $i^{th}$ main body region block to a center pixel point of the digital image.

11. The device according to claim 9, the first calculating logic further comprising:
a first calculating unit executed by the processor for calculating a square root distance value between the plurality of pixel points in the plurality of main body region blocks and the center pixel point of the digital image;
a summing unit executed by the processor for summing square root distance values of the plurality of the pixel points in the plurality of main body region blocks to obtain a total square root distance value of the plurality of the pixel points in the plurality of main body region blocks; and
a second calculating unit executed by the processor for calculating a normalized distance value from the plurality of the pixel points in the plurality of main body region blocks to a center pixel point of the digital image through a preset distance normalization conversion relation based on the total square root distance value of the plurality of the pixel points in the plurality of main body region blocks, the preset distance normalization conversion relation comprising a normalized process imposed on the total square root distance value of the plurality of the pixel points in the plurality of main body region blocks according to a selected normalized parameter value.

12. The device according to claim 11, the preset distance normalization conversion relation $R_i$ comprising $R_i = 2r_i/\sqrt{w^2+h^2}$, where $r_i$ is the total square root distance value of a plurality of the pixel points in the $i^{th}$ main body region block, $\sqrt{w^2+h^2}$ is the selected normalized parameter value, w is a width of the digital image, and h is a height of the digital image.

13. The device according to claim 9, the second calculating logic further comprising:
an obtaining unit executed by the processor for obtaining an optimal theoretical quality score value; and
a processing unit executed by the processor for using a quotient between the calculated quality score value of the digital image and the optimal theoretical quality score value as a normalized quality score value for the digital image;
the grading logic further comprising
a grading unit executed by the processor for grading the quality of the digital image according to the normalized quality score value of the digital value and a preset normalized digital image quality score threshold value.

14. The device according to claim 13, the obtaining unit further comprising:
a selecting subunit executed by the processor for selecting values of n, $S_{fi}$, $S_b$, and $R_i$ according to a relation between the number of the main body region blocks and the quality of the digital image, and a relation among the first ratio value, the second ratio value, and the normalized distance value, where $S_{fi}$ denotes the first ratio value of an area of the $i^{th}$ main body region block to the total area of the digital image, $S_b$ denotes the second ratio value of the area of the background region blocks to the total area of the digital image, n is the number of the main body region blocks extracted from the digital image, and $R_i$ denotes the normalized distance value from the plurality of the pixel points in the $i^{th}$ main body region block to the center pixel point of the digital image; and
a processing subunit executed by the processor for substituting the selected values of n, $S_{fi}$, $S_b$, and $R_i$ into the preset digital image quality score conversion relation S, and taking a calculated maximum value as the optimal theoretical quality score value.

15. The device according to claim 9, the grading logic further comprising:
a comparing unit executed by the processor for comparing the quality score value of the digital image and the preset digital image quality score threshold value;
a first grading unit executed by the processor for setting a grade of the digital image to be a grade greater than a grade corresponding to the preset digital image quality score threshold value when the quality score value of the digital image is larger than the preset digital image quality score threshold value; and
a second grading unit executed by the processor for setting a grade of the digital image to be a grade less than or equal to a grade corresponding to the preset digital image quality score threshold value when the quality score value of the digital image is smaller than or equal to the preset digital image quality score threshold value.

16. The device according to claim 9 the preset digital image quality score conversion relation calculated by summing a product for each of the plurality of main body region blocks,
the product computed for a main body region block based on the first ratio value of an area of the main body region block to the total area of the digital image, the second ratio value of the area of the background region blocks to the total area of the digital image, and the normalized distance value from a plurality of the pixel points in the main body region block to the center pixel point of the digital image, and
the normalized distance value based on a preset distance normalization conversion relation for a main body region block, the preset distance normalization conversion relation calculated by computing twice the product of a total square root distance value of a plurality of the pixel points in the main body region block and the selected normalized parameter value.

17. A non-transitory computer readable storage medium comprising computer program code for execution by a processor, the computer program code comprising instructions for:

obtaining, by the processor, a digital image;
extracting, by the processor, a plurality of main body region blocks from the digital image, a number of the plurality of main body region blocks comprising a natural number;
calculating, by the processor for each of the main body region blocks, a first ratio value of art area of a respective main body region blocks to a total area of the digital image, a second ratio value of an area of background region blocks to the total area of the digital image, and a normalized distance value from a plurality of pixel points in the respective main body region blocks to a center pixel point of the digital image, the background region blocks comprising residual region blocks after each of the main body region blocks are extracted from the digital image;
calculating, by the processor, to obtain a quality score value of the digital image through a preset digital image quality score conversion relation based on the first ratio value, the second ratio value, and the normalized distance value, the preset digital image quality score conversion relation comprising a sum of the first ratio values, the second ratio values, and the normalized distance values of the plurality of main body region blocks; and
grading, by the processor, a quality of the digital image according to the quality score value of the digital image and a preset digital image quality score threshold value.

18. The medium according to claim 17, the preset digital image quality score conversion relation S comprising $$S = \sum_{i=1}^{n} S_b S_{fi}(1 - R_i),$$

where,
$S_{fi}$ denotes the first ratio value of an area of the $i^{th}$ main body region block to the total area of the digital image, $S_b$ denotes the second ratio value of the area of the background region blocks to the total area of the digital image, n is the number of the main body region blocks extracted from the digital image, and $R_i$ denotes the normalized distance value from a plurality of the pixel points in the $i^{th}$ main body region block to the center pixel point of the digital image.

19. The medium according to claim 17, the calculating the normalized distance value from a plurality of the pixel points in the plurality of main body region blocks to the center pixel point of the digital image further comprising:
calculating, by the processor, a square root distance value between the plurality of pixel points in the plurality of main body region blocks and the center pixel point of the digital image;
summing, by the processor, the square root distances of the plurality of the pixel points in the plurality of main body region blocks to obtain a total square root distance value of the plurality of the pixel points in the plurality of main body region blocks; and
calculating, by the processor, the normalized distance value from the plurality of the pixel points in the plurality of main body region blocks to the center pixel point of the digital image through a preset distance normalization conversion relation based on the total square root distance value of the plurality of the pixel points in the plurality of main body region blocks, the preset distance normalization conversion relation comprising a normalized process imposed on the total square root distance value of the plurality of the pixel points in the plurality of main body region blocks according to a selected normalized parameter value.

20. The medium according to claim 19, the preset distance normalization conversion relation $R_i$ comprising $R_i = 2r_i / \sqrt{w^2+h^2}$, where, $r_i$ is the total square root distance value of a plurality of the pixel points in the $i^{th}$ main body region block, $\sqrt{w^2+h^2}$ is the selected normalized parameter value, w is a width of the digital image, and h is a height of the digital image.

21. The medium according to claim 17, the instructions further comprising instructions, executed after calculating and obtaining the quality score value of the digital image, for:

obtaining, by the processor, an optimal theoretical quality score value;

using, by the processor, a quotient between the calculated quality score value of the digital image and the optimal theoretical quality score value as a normalized quality score value for the digital image; and grading, by the processor, the quality of the digital image according to the quality score value of the digital image and the preset digital image quality score threshold value, the grading comprising:

grading, by the processor, the quality of the digital image according to the normalized quality score value of the digital image and a preset normalized digital image quality score threshold value.

22. The medium according to claim 21, the obtaining the optimal theoretical quality score value further comprising:

selecting, by the processor, values of n, $S_{fi}$, $S_b$, and $R_i$ according to a relation between the number of the main body region blocks and the quality of the digital image, and a relation among the first ratio value, the second ratio value, and the normalized distance value, where $S_{fi}$ denotes the first ratio value of an area of the $i^{th}$ main body region block to the total area of the digital image, $S_b$ denotes the second ratio value of the area of the background region blocks to the total area of the digital image, n is the number of the main body region blocks extracted from the digital image, and $R_i$ denotes the normalized distance value from the plurality of the pixel points in the $i^{th}$ main body region block to the center pixel point of the digital image; and substituting, by the processor, the selected values of n, $S_{fi}$, $S_b$, and $R_i$ into the preset digital image quality score conversion relation S, and taking, by the processor, a calculated maximum value as the optimal theoretical quality score value.

23. The medium to claim 17 the preset digital image quality score conversion relation calculated by summing a product for each of the plurality of main body region blocks, the product computed for a main body region block based on the first ratio value of an area of the main body region block to the total area of the digital image, the second ratio value of the area of the background region blocks to the total area of the digital image, and the normalized distance value from a plurality of the pixel points in the main body region block to the center pixel point of the digital image, and the normalized distance value based on a preset distance normalization conversion relation for a main body region block, the preset distance normalization conversion relation calculated by computing twice the product of a total square root distance value of a plurality of the pixel points in the main body region block and the selected normalized parameter value.

* * * * *